US006451367B1

(12) United States Patent
McNaught et al.

(10) Patent No.: US 6,451,367 B1
(45) Date of Patent: Sep. 17, 2002

(54) FOOD COMPOSITIONS INCLUDING RESISTANT STARCH

(75) Inventors: Kenneth John McNaught, North Epping; Ian Lewis Brown, Gymea; Robert Ganly, Kew, all of (AU)

(73) Assignee: Penford Holdings Pty Limited, Bellevue, WA (US)

( * ) Notice: Subject to any disclaimer, the term of this patent is extended or adjusted under 35 U.S.C. 154(b) by 0 days.

(21) Appl. No.: 09/977,174

(22) Filed: Oct. 12, 2001

Related U.S. Application Data

(63) Continuation of application No. 08/448,582, filed as application No. PCT/AU93/00684 on Dec. 24, 1993, now Pat. No. 6,303,174.

(30) Foreign Application Priority Data

Dec. 24, 1992 (AU) .............................................. PL6537

(51) Int. Cl.[7] ........................... A01H 5/10; A23L 1/308; C08B 30/00

(52) U.S. Cl. ....................... 426/549; 426/559; 426/560; 426/449; 426/451; 426/620; 426/621; 536/102

(58) Field of Search ................................ 426/549, 559, 426/621, 560, 449, 451, 620; 536/102

(56) References Cited

U.S. PATENT DOCUMENTS

| | | | |
|---|---|---|---|
| 3,541,587 A | 11/1970 | Washburn | 99/88 |
| 4,529,607 A | 7/1985 | Lenchin et al. | 426/94 |
| 4,590,084 A | 5/1986 | Miller et al. | 426/557 |
| 4,759,942 A | 7/1988 | VonFulger | 426/621 |
| 5,268,367 A | 12/1993 | Miwa et al. | 514/60 |
| 5,300,145 A | 4/1994 | Fergason et al. | 106/213 |
| 5,714,600 A | 2/1998 | McNaught | 536/102 |
| 6,303,174 B1 * | 10/2001 | McNaught et al. | 426/549 |

FOREIGN PATENT DOCUMENTS

| | | |
|---|---|---|
| AU | B-45616/89 | 5/1990 |
| AU | B-60630/90 | 2/1991 |
| AU | B-61403/90 | 2/1991 |
| AU | A-25124/92 | 3/1993 |
| EP | 0 118 240 A2 | 12/1984 |
| EP | 0 118 240 A3 | 12/1984 |
| EP | 0 360 046 A1 | 3/1990 |
| EP | 0 512 249 A1 | 11/1992 |
| FR | 2 518 372 | 6/1983 |
| WO | WO 90/15147 | 12/1990 |
| WO | WO 93/03628 | 3/1993 |
| WO | WO 94/03049 | 2/1994 |
| WO | WO 94/14342 | 7/1994 |

OTHER PUBLICATIONS

Brown, I.L. et al., "Hi–maize™: new directions in starch technology and nutrition," *Food Australia*, 47(6):272–275 (Jun., 1995).

Cluskey, J.E.et al., "Fractionation and Characterization of Dent Corn and Amylomaize Starch Granules," *Peoria –Starch/Starke*, 32(4.S):105–109 (1980).

Derwent Abstract No. 91–058433 "Shredded farinaceous cereal prod. and prepn.—by cooking whole grains having intact bran layer, treating with R–enzyme (debranching enzyme), tempering, shredding and baking or toasting," Abstract CA2016950.

Derwent Abstract No. 92–120139, "Food which is slowly digested with high anti–obesity activity–prepd. by contacting starch with cane sugar fatty acid ester," Abrstract J04063560.

Derwent Abstract No. 92–120140 "Slowly digested food material for heat processing–comprises starch, fatty acid cpd. and water," Abstract J04063564.

Eliasson, A. et al., "Starch: Physiochemical and Functional Aspects," Marcel Dekker, Inc., New York, 440–449 (1996).

Englyst et al., "Breakdown of Resistant and Redily Digestible Starch by Human Gut Bacteria," *J. Sci. Food Agric.*, 37:699–706 (1986).

Fornal, L. et al., "Chemical Characteristics and Physico–chemical Properties of the Extruded Mixtures of Cereal Starches" *Starch/Starke*, 39(3):75–78 (1987).

Hari, P.K. et al., "Gelatinisation of Starch and Modified Starch," *Starch*, 41(3):88–91 (1989).

Knight, J.W., The Starch Industry, Pergamon Press Ltd., London 1–2 (1969).

McCleary et al., "A Rapid Procedure For Total Starch Measurement in Cereal Grains and Products," *Proc. 42nd RACI Cereal Chem. Conf.* Christchurch, NZ (1992), Ed. VJ Humphrey–Taylor pp. 304–312.

Muir et al., "Food processing and maize variety affects amounts of starch escaping digestion in the small intestine[1–3]," *Am. J. Clin. Nutr.*, 61:82–89 (1995).

Muir et al., "Measurement of Resistant Starch Factors Affecting Starch Escaping Digestion In Vitro," *Am. J. Clin. Nutr.*, 56:123–127 (1992).

Olson, R.A. and Frey, K.J., Eds., In: *Nutritional Quality of Cereal Grains; Genetic and Agronomic Improvement*, American Society of Agronomy, Madison, WI, USA, Chapter 7: "Corn" by Glover and Mertz., pp. 200–201.

Wolf, M.J. et al., "Corn Endosperm: Protein Distribution and Amino Acid Composition in Amylomaize vs. Normal Dent Hybrid," *Cereal Chemistry*, 52(6):765–770 (1975).

Szczodrak et al., "Starch and Enzyme–Resistant Starch From High–Amylose Barley," *Cereal Chemistry*, 68(6):589–596 (1991).

* cited by examiner

*Primary Examiner*—Carolyn Paden
(74) *Attorney, Agent, or Firm*—Marshall, Gerstein & Borun

(57) ABSTRACT

The invention described in this application relates to food compositions such as breakfast cereals, bread and the like which have an enhanced dietary fiber content. In each case the source of dietary fiber is a starch, preferably a maize starch, having an amylose content of 50% or more, the starch being incorporated into a food composition as appropriate. Alternatively, grains or legumes or parts thereof which include starch of this amylose content may be used.

10 Claims, 1 Drawing Sheet

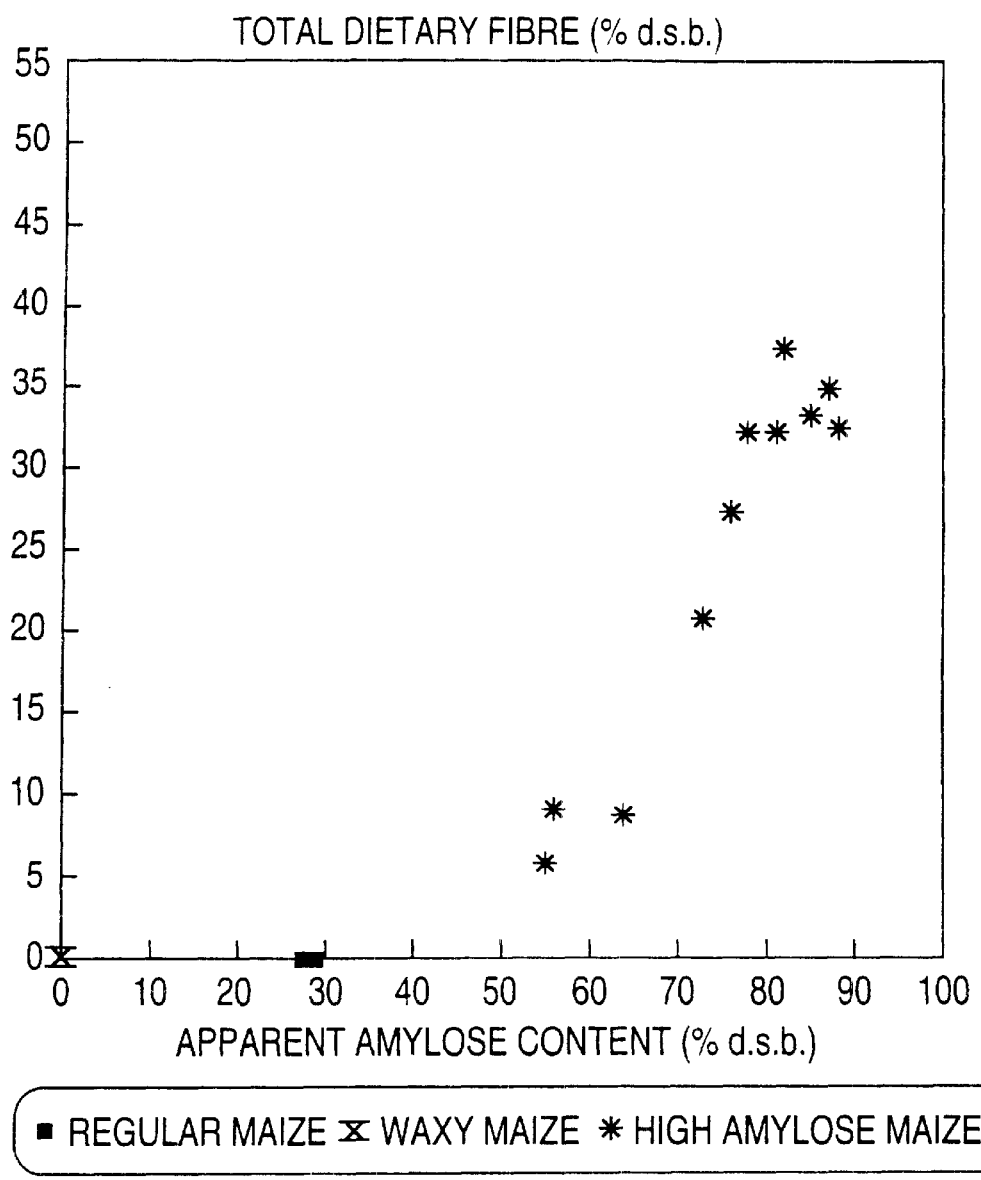

FOOD COMPOSITIONS INCLUDING RESISTANT STARCH

This application is a continuation of U.S. Ser. No. 08/448,582, filed Aug. 3, 1995, issued as U.S. Pat. No. 6,303,174 on Oct. 16, 2001 which was the National Stage of International Application No. PCT/AU93/00684, filed Dec. 24, 1993.

TECHNICAL FIELD

This invention relates to food composition which include resistant starch as a source of dietary fiber and in particular to food compositions which include grain or parts thereof and starch derived from the grain which is high in amylose.

BACKGROUND ART

It has been recognised that a balanced diet must include an adequate level of dietary fiber. There are many natural food sources of dietary fiber of which cereals, particularly bran, are recognized as a good source.

However, it would seem that a high proportion of diets of people of the developed countries contain an inadequate level of dietary fiber. An inadequate level of dietary fiber has been linked with a number of diseases which may be broadly classified as metabolic and gastrointestinal. Examples of these diseases are diabetes mellitus, diverticular disease and colonic cancer.

It has also be found that some forms of dietary fiber are useful in lowering blood cholesterol.

One approach to providing adequate levels of dietary fiber has been to produce processed foods which are high in dietary fiber content. Such foods include breakfast cereals, snack bars, bread and the like. Typically bran, outer tissues of the kernel, including pericarp from a variety of cereal sources including wheat, maize, oats and other plant extracts have been used as the source of fiber.

More recently, resistant starches have been recognized as a potential source of dietary fiber. Resistant starches are starches that are highly resistant to hydration and which when ingested pass through the upper regions of the gastrointestinal tract largely unchanged.

To date the only natural sources of resistant starch at a significant level are green bananas and raw potatoes. Such sources do, however, present substantial problems in formulating satisfactory food products, in particular low gelatinization temperatures which are typically 60–80° C.

It is also possible to produce resistant starch by extensive processing involving repeated cooking and cooling of starch pastes.

In copending International patent application No. PCT/AU93/00389 filed Jul. 30, 1993 entitled "High Amylose Starch and Resistant Starch Fractions" now U.S. Pat. No. 5,714,600 there is disclosed a hybrid maize seed which is capable of producing a starch having an amylose content of more than about 80%. That application further discloses a maize starch derived from such seed having a amylose content of more than about 80%. This starch was designated as "High Amylose Starch" in view of the surprising high amylose content. A number of examples of compositions including high amylose starch were given which included a number of food applications.

Surprisingly, it has now been found that the aforementioned high amylose starch is high in dietary fiber content and is a resistant starch. Moreover, it has been found that such starches may be advantageously incorporated into food products to achieve enhanced levels of dietary fiber content. Additionally, these starches have relatively high gelatinization temperatures, typically 160–170° C.

SUMMARY OF THE INVENTION

Accordingly, the present invention consists in a food composition having an enhanced dietary fiber content, characterized in that the dietary fiber is derived from a starch having an amylose content of at least about 50% or if a rice starch, at least 27% and/or from a grain or parts thereof, the starch content of which has an amylose content of at least about 50% or if a rice starch, at least about 27%.

BRIEF DISCLOSURE OF THE DRAWING

FIG. 1 is a graph of total dietary fiber versus amylose content of three maize varieties.

DISCLOSURE OF INVENTION

For the purpose of the description that follows, "high amylose" means an amylose content (dsb) of 50% or more, preferably 70% or more, most preferably 80% or more. Particularly preferred amylose contents are 85% or more and 90% or more. For a rice starch, an amylose content of 27% or more is considered to be a "high amylose starch". Note that the method used to determined amylose content is that described in application No. PCT/AU93/00389, now U.S. Pat. 6,303,174 the contents of which are incorporated herein by way of reference.

Whilst the resistant nature of the starches of this invention are not fully understood, it is suspected that the molecular arrangement of the glucan polymers, including crystalline structures, and the association of these polymers with other substances, including free fatty acids, may be responsible for imparting the resistant characteristic.

In the accompanying FIG. 1, there is shown a graph of total dietary fiber versus amylose content of a number of samples representing three maize varieties-regular maize, waxy maize and high amylose maize. It will be seen from this graph that all the regular maize and waxy maize varieties were substantially nil in dietary fiber content, whereas all of the high amylose samples were found to have a measurable dietary fiber content. Based on the fact that the regular maize samples were found to have an amylose content of about 28% whilst the waxy maize was nil, the finding that at an amylose content of greater than about 50% was associated with the presence of dietary fiber is somewhat surprising. It is also surprising that the dietary fiber content increases to such an extent relative to increasing amylose content.

In Table 1 set out below, it will be seen that when resistant starch is determined by two methods, the content for the high amylose starches, particularly high amylose 80, is substantially greater than regular maize starch.

TABLE 1

TOTAL DIETARY FIBRE AND RESISTANT STARCH LEVELS IN MAIZE STARCH

| | Total Insoluble Dietary Fibre (% dsb) | Resistant Starch Muir et al (% dsb) | Resistant Starch McCleary et al (% dsb) |
| --- | --- | --- | --- |
| Waxy Maize Starch 8/91 | <0.2 | 0.7 ± 0.5 | 5.8 |

TABLE 1-continued

TOTAL DIETARY FIBRE AND RESISTANT STARCH LEVELS IN MAIZE STARCH

| | Total Insoluble Dietary Fibre (% dsb) | Resistant Starch | |
|---|---|---|---|
| | | Muir et al (% dsb) | McCleary et al (% dsb) |
| Regular Maize Starch 7/91 | <0.2 | 1.3 ± 0.9 | −0.4 |
| High Amylose 50 7/91 | 8.0 | 8.2 ± 0.4 | 7.5 |
| High Amylose 80 4/91 | 21.2 | — | 11.9 |
| High Amylose 80 10/91 | 31.8 | 20.0 ± 1.8 | 18.1 |

Muir et al "Measurement of Resistant Starch factors affecting starch escaping digestion in vitro" Am. J. Clin. Nutr. 56, 123–127 (1992)

McCleary et al "A rapid procedure for total starch measurement in cereal grains and products" Proc. 42nd RACI Cereal Chem. Conf. Christchurch, NZ (1992) Ed. VJ Humphrey-Taylor pp304–312.

The high amylose starch of the invention may be incorporated into a wide range of food products. A non-exhaustive list of such products include: pasta, noodles, instant noodles, breakfast cereals, baked goods such as bread, biscuits, crackers and the like, snack foods, cheese and other dairy based products.

Incorporation of the high amylose starch of the invention into food products will be at a level consistent with the required level of dietary fiber in the finished product. A broadly useful level of incorporation generally lies in the range of from about 5–60%.

It will be appreciated that in some products, high amylose content whole grain or grits derived from the grain may be incorporated alone or in combination with high amylose starch.

Furthermore, the high amylose starch of the invention may be used as a partial replacement for the flour incorporated in products such as bread.

Whilst the dietary fiber and resistant starch results shown respectively in FIG. 1 and Table 1 are directed to maize starch, it should be appreciated that this invention is not so-limited. For example, high amylose wheat, high amylose rice, high amylose pea and high amylose barley starch may also be utilized in the food compositions of this invention.

MODES FOR CARRYING OUT THE INVENTION

In order to better understand the nature of this invention, a number of examples will now be described.

Breakfast Cereals

The high amylose starch of the invention can be used to advantage in a variety of ready-to-eat breakfast cereals. These include flaked cereals, extruded flake cereals, extruded gun-puffed cereals, extruded and other shredded cereals, oven-puffed cereals, granola cereals and extruded expanded cereals.

(1) Flaked Cereals

While still in grit form A-958 (Hi-maize-high amylose starch 80%, available from Starch Australasia Limited) can be processed to make a cornflake by using higher than conventional levels of water addition and longer cooking times. The final toasted product (formulation 2571/1) has a light color and is significantly higher in dietary fiber content as is shown in Table 2.

(2) Extruded Flake

An extruded flake product was made by rotary cooking, cold form pelleting, flaking and toasting according to formulation 2562/1. it will be seen from Table 2 that 2562/1 had a significantly higher dietary fiber content as compared with the control.

Formulation: Extruded Flake

| | 2562/1 % | Control % |
|---|---|---|
| Maize Polenta | 45.0 | 45.0 |
| Starch A958 | 42.0 | — |
| Regular Maize Starch | — | 42.0 |
| Sugar | 8.7 | 8.7 |
| Salt | 1.9 | 1.9 |
| Malt | 2.5 | 2.5 |
| | 100.0 | 100.0 |

Formulations 2459/2(b) and 2459/2(c) were prepared as 2562/1. However, 2459/2(b) were tempered overnight while for 2459/2(c), the flakes were dried out at 70° C. for 30 minutes prior to flaking.

Formulation: Extruded Flake (Multigrain)

| | 2459/2(b) % | 2459/2(c) % |
|---|---|---|
| Starch A958 | 43.1 | 43.1 |
| Rice | 11.5 | 11.5 |
| Oats | 11.5 | 11.5 |
| Wheat | 20.7 | 20.7 |
| Sugar | 8.6 | 8.6 |
| Malt | 2.6 | 2.6 |
| Salt | 2.0 | 2.0 |
| | 100.0 | 100.0 |

The textural properties of the resultant flakes were significantly different for each formulation with the 2450/2 forming hollow or pillow-like flakes, whereas 2459/2(c) had a wrinkled, blistered appearance.

The dietary fiber content of the two flake formulations 2459/2(b) and 2459/2(c) are set out in Table 2, from which it will be seen that overnight tempering of the moist pellet containing starch A958 increases the total dietary fiber content of the resultant flake significantly. A further extruded flake product was made according to formulation 2556/1.

Formulation: Extruded Flake

| | 2556/1 % |
|---|---|
| Wholegrain Calrose Rice | 56.0 |
| Wheatgerm | 7.0 |
| Sugar | 6.9 |
| Salt | 1.5 |
| Malt | 1.3 |
| Icing Sugar Mixture | 6.3 |
| Gluten | 12.6 |
| Starch A958 | 8.4 |
| | 100.0 |

The dietary fiber content for 2446/1 is set out in Table 2.

TABLE 2

Dietary Fibre Content of Breakfast Cereals

| Formulation | Moisture Content % | Total Dietary Fibre (% dsb) | Soluble Dietary Fibre (% dsb) | Insoluble Dietary Fibre (% dsb) |
|---|---|---|---|---|
| Cornflake | | | | |
| (Control) | 4.6 | 4.0 | 1.0 | 2.9 |
| 2571/1 | 6.2 | 20.7 | 1.2 | 19.5 |
| 2562/1 | 4.7 | 12.4 | 0.4 | 12.0 |
| Control | 6.5 | 3.9 | 0.3 | 3.5 |
| 2459/2(b) | 4.3 | 17.1 | — | — |
| 2459/2(c) | 5.0 | 15.3 | — | — |
| 2556/1 | 5.4 | 4.5 | 1.1 | 3.5 |

(3) Wheat Bites

This product is a crunchy "pillow" which can be consumed as a ready-to-eat cereal with milk or eaten piece-wise as a snack.

The formulation of the product is as follows:

| Ingredient | % (wet mix) |
|---|---|
| Fine wholemeal flour | 36.67 |
| Castor sugar | 15.35 |
| Oat flour | 12.80 |
| Starch A958 | 11.94 |
| Fine Bran #3 | 8.53 |
| Vitamin B1 | 0.0051 |
| Vitamin B2 | 0.0043 |
| Niacin | 0.0316 |
| Iron | 0.0145 |
| Honey | 1.19 |
| Water | 13.47 |
| | 100.00 |

Preparation of the product is as follows:
(a) premix dry ingredients;
(b) process cereal mix with honey and water in a twin screw extruder;
(c) crimp and cut ropes from extruder to form individual pillows;
(d) toast pillows to reduce moisture and develop color and flavor.

The product was found to have excellent crunch after contact with milk for five minutes. It has a distinctive appearance being a pillow with "strand" markings. Total dietary fiber content was found to be 10%, at a moisture content of 2–4%. The product is unusual in that it has a light airy texture with a relatively high level of total dietary fiber.

The cereal products described above were characterized by several physical properties which were quite unexpected. For example, some of the flakes were blistered whilst others were bubbled and appeared as if "popped". These characteristics are highly desirable and would not have been considered achievable using formulations of this type.

In addition, these cereal products extrude well, display moderate to high expansion, yielding a final product with a medium to coarse cell structure. The products are unusual in that they have a light airy texture whilst containing a relatively high level of total dietary fiber.

The breakfast cereal products have also been found to have an excellent "bowl life" in that the flakes retained their crunch after contact with milk for five minutes.

Furthermore, during processing and prior to toasting, it was observed that the flakes had a tendency to stick less to each other as compared with the control.

Bread

A number of bread samples were prepared using a high amylose starch and for comparison a waxy maize starch "MAZACA" trade mark of Starch Australasia Limited. The starches were incorporated into the bread at a 5% and a 10% level of flour replacement.

In Table 2, set out below, are the results obtained for each of the bread samples. These results clearly show that at both the 5% and 10% levels of high amylose starch, the dietary fiber content was substantially more than both the control product and the mazaca based product. Furthermore, it should be noted that the actual level of dietary fiber found was significantly more than would be expected. This suggests that a synergistic effect occurred during baking.

Indeed, it would have been expected that the dietary fiber content would decrease as resistant starch is destroyed during such heating processes.

TABLE 3

| Analysis | Wheat Starch Control | | | High Amylose Starch | | Mazaca | |
|---|---|---|---|---|---|---|---|
| Moisture % | — | | | 13.0 | | 12.6 | |
| Total dietary fibre (TDF) % (DB) (Resistant starch) | — | | | 27 | | 0 | |
| Test baking | | | | | | | |
| Rate of flour replacement (%) | 0 | 5 | 10 | 5 | 10 | 5 | 10 |
| Water absorption (%) | — | — | — | 58 | 58 | 58 | 58 |
| Total loaf score (%) | 76 | 80 | 76 | 75 | 73 | 79 | 71 |
| Fibre in bread | | | | | | | |
| TDF % (DE) | 4.2 | 4.0 | — | 6.9 | 8.7 | 4.0 | |
| (approx. expected *TDF %) | — | — | — | 5.2 | 6.4 | 4.0 | |

"expected" bread TDF is based on control loaf fibre plus raw starch fibre.

A further series of test bakings were done according to the formulations set out below:

| | Batch Nos. | | | | | |
|---|---|---|---|---|---|---|
| Ingredients | 1 | 2 | 3 | 4 | 5 | 6 |
| Flour (g) | 1000 | 950 | 900 | 850 | 800 | 750 |
| Starch A.958 (g) | 0 | 50 | 100 | 150 | 200 | 250 |
| Gluten (g) | 0 | 10 | 20 | 30 | 40 | 50 |
| Salt (g) | 18 | 18 | 18 | 18 | 18 | 18 |
| Improver (g) | 15 | 15 | 15 | 15 | 15 | 15 |
| Fat (g) | 20 | 20 | 20 | 20 | 20 | 20 |
| Yeast (g) | 12 | 12 | 12 | 12 | 12 | 12 |
| Water (mL) | 600 | 610 | 630 | 650 | 670 | 700 |

Each batch was processed in a conventional manner. The total dietary fiber for each batch was found to be:

| Batch No. | Total Dietary Fibre (% dsb) |
|---|---|
| 1 | 5.4 |
| 2 | 7.1 |
| 3 | 9.1 |

-continued

| Batch No. | Total Dietary Fibre (% dsb) |
| --- | --- |
| 4 | 10.8 |
| 5 | 12.8 |
| 6 | 14.5 |

In addition, it was noted that inclusion of the high amylose starch did not have an adverse effect on crumb color, whilst increasing levels of high amylose starch led to increasing dough water absorption levels.

Generally it was concluded that the high amylose starch was an excellent source of dietary fiber for inclusion in bread since any detrimental effect on load volume and crumb firmness could be readily overcome by appropriate formulation changes known to those skilled in the art.

It has also been found that gluten free bread which is high in dietary fiber may be produced using the high amylose starch of the invention. This is important as conventional gluten free bread, which is consumed by sufferers of coeliac disease, is generally low in dietary fiber.

For guidance, up to about 15% may be incorporated into a gluten free bread to yield a dietary fiber content of about 10%.

As well as being able to provide enhanced dietary fiber content in bread, the high amylose starch acts to reduce staling on storage of the bread, by it is thought, reducing the level of amylopectin and helping to maintain the moisture content of the bread.

Noodles

Typically, up to about 24% of high amylose starch may be used as a flour replacement in spaghetti. This yields a dietary fiber content of up to about 8.7%.

In use, it has been found that spaghetti made from high amylose starch has less of the "speckiness" which is usually associated with the addition of more conventional fiber additivies such as bran to achieve higher dietary fiber content. Furthermore, during cooking, the spaghetti is less sticky and remains al dente for longer.

Other Food Products

It has been found that, in addition to providing a dietary fiber benefit in instant noodles, these products have a greater crispiness as compared with conventional formulated products.

In the formulation of biscuits and crackers, it is possible to overcome the use of a laminator by using the high amylose starch of the invention. This is due to the expansion, popping effect which serves to impart a lighter texture to such products.

Industrial Applicability

From the foregoing description it will be evident that the present invention provides a means for enhancing the dietary fiber content of a variety of food compositions. Not only does this have obvious nutritional benefits, but it allows for the production of food compositions having physical characteristics not previously known with conventional formulations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A food composition comprising a breakfast cereal having an enhanced dietary fiber content comprising a food and a food ingredient, said food ingredient comprising substantially chemically unmodified starch granules from a grain, said starch granules comprising about 10–60% w/w of resistant starch and having an amylose content of at least about 70% w/w, or if starch granules from rice, an amylose content of at least about 27% w/w, said starch granules providing a sufficient resistant starch so as to yield an enhanced dietary fiber content in the food composition of about 1.5% w/w or more.

2. A food composition as in claim 1, wherein the breakfast cereal is selected from the group consisting of flaked cereals, and extruded flakes.

3. A food composition as in claim 2, wherein the breakfast cereal is bubbled, popped or blistered in appearance.

4. A food composition as in claim 2, wherein moist pellets produced during formation of the flakes are tempered overnight, such that the dietary fiber content thereof is about 17.5% w/w or more.

5. A food composition as in claim 2, wherein the breakfast cereal is in the form of "pillows" having a light, airy texture.

6. A food composition as in claim 5, wherein the breakfast cereal has a dietary fiber content of about 10% w/w.

7. A food composition as in claim 1, wherein the dietary fiber content is about 4.5% w/w or more.

8. A food composition as in claim 7, wherein the dietary fiber content is about 12.4% w/w or more.

9. A food composition as in claim 8, wherein the dietary fiber content is about 15.3% w/w or more.

10. A food composition as in claim 9, wherein the dietary fiber content is about 20.7% w/w or more.

* * * * *